March 4, 1958 — T. E. BELSHAW — 2,825,494
DOUGH DISPENSER
Filed Jan. 2, 1957 — 2 Sheets-Sheet 1
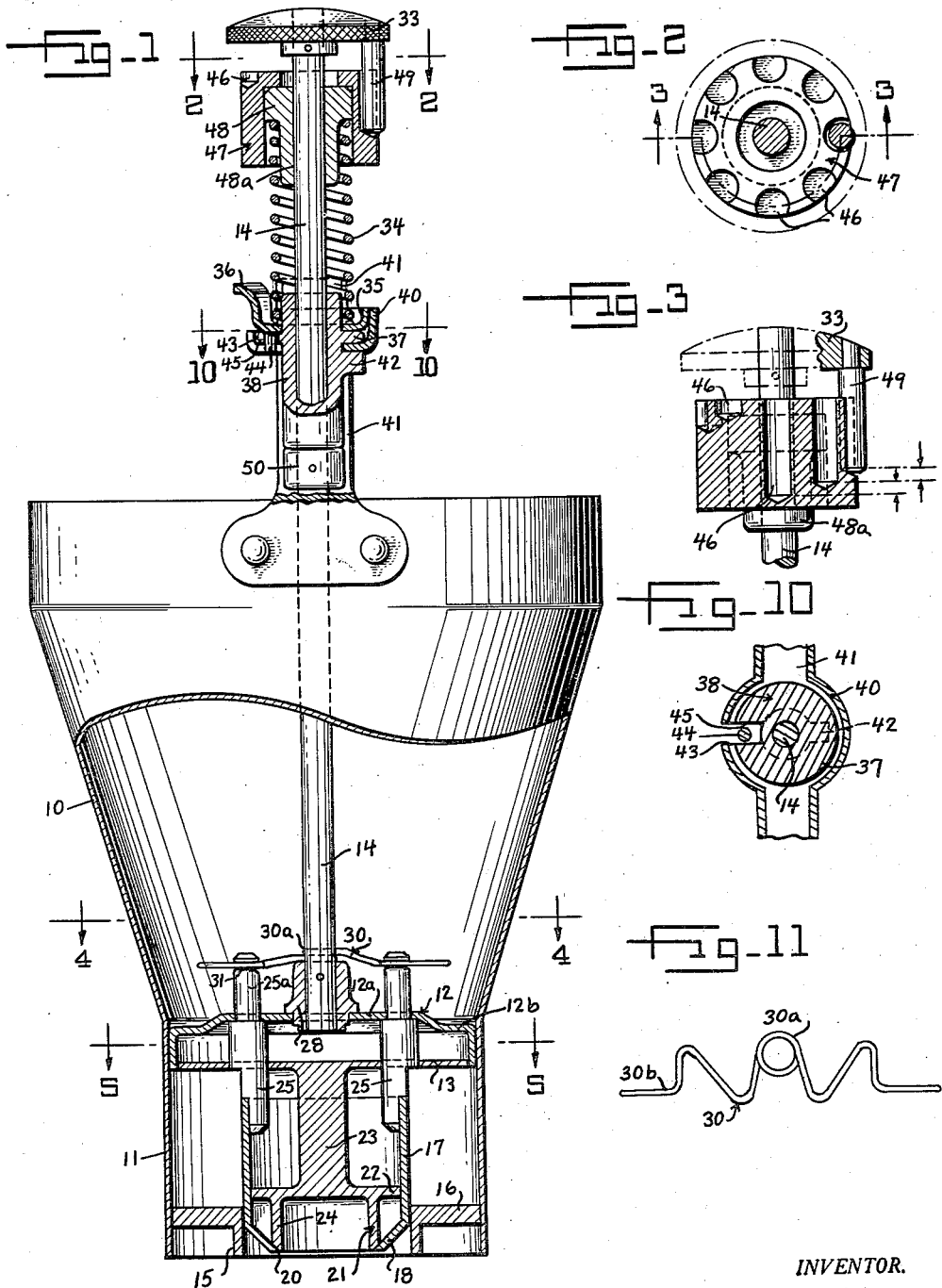
INVENTOR.
Thomas E. Belshaw
BY *Barnes & Seed*
Attorneys March 4, 1958  T. E. BELSHAW  2,825,494
DOUGH DISPENSER
Filed Jan. 2, 1957  2 Sheets-Sheet 2

INVENTOR.
Thomas E. Belshaw
BY Barnes & Leed
Attorneys

United States Patent Office 2,825,494
Patented Mar. 4, 1958

2,825,494

DOUGH DISPENSER

Thomas E. Belshaw, Seattle, Wash.

Application January 2, 1957, Serial No. 632,175

10 Claims. (Cl. 222—440)

The present invention relates to a dough dispensing and metering device whose moving parts are intended to be interchangeable with the moving parts of the dough former shown in U. S. Patent No. 2,637,282 so that the same hopper and actuating assemblies can be utilized for both.

A principal object of the invention is to provide a simple and economical device which will accurately dispense a charge of dough of the thinner viscosities, such for example as used for cup-cakes, pancakes, etc.

The invention further aims to provide such a device in which the size of the dough charge can be easily selectively varied.

As another object the invention aims to provide such a device which can be readily disassembled for cleaning purposes.

With yet additional objects and advantages in view which, with the foregoing, will appear and be understood in the course of the following description and claims, the invention consists in the novel construction and in the adaptation and combination of parts hereinafter described and claimed.

In the accompanying drawings:

Figure 1 is a side elevational view partly in vertical section of my dough dispensing and metering device.

Fig. 2 is a transverse sectional view taken as indicated by the line 2—2 of Fig. 1.

Fig. 3 is a fragmentary vertical sectional view taken along the line 3—3 of Fig. 2.

Fig. 10 is a transverse sectional view taken as indicated by the line 10—10 of Fig. 1, and Fig. 11 is a plan view of the spring clip in its relaxed state.

Figure 4:
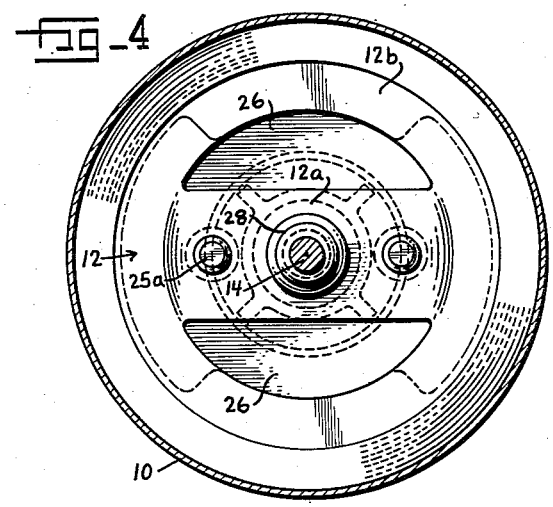
Fig. 4 is a transverse sectional view taken as indicated by the line 4—4 of Fig. 1, but with the spring clip removed.
Figure 5:
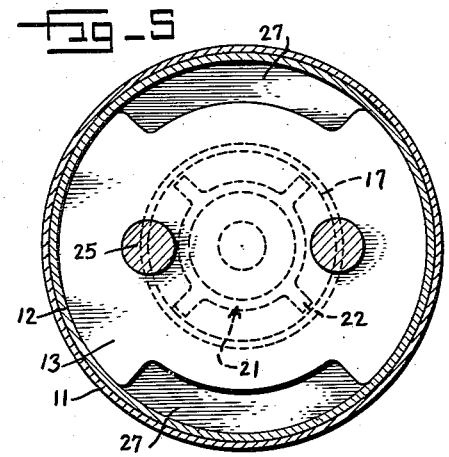
Fig. 5 is a transverse sectional view taken along the line 5—5 of Fig. 1.
Figure 6:
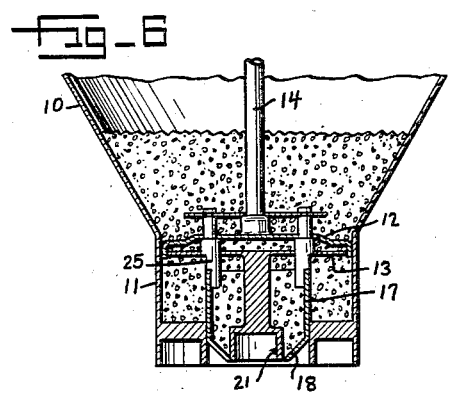
Figs. 6 through 9 are schematical views illustrating various stages of the operating cycle of the device.

As before-mentioned, my invention is directed to a device having several parts in common with the dough former of Patent No. 2,637,282, and namely one in which a dough hopper 10 has a valve chamber 11 at its lower end into which dough from the hopper is metered by a check valve unit 12—13 carried by a reciprocating rod 14, the metered dough then being discharged through a discharge tube 15 projecting from an annular plate 16 fitted into the lower rod of the valve chamber. In the present instance, a valve chest 17 reciprocates within the discharge tube in unison with the rod 14. This chest has an annular beveled seat 18 at its lower end surrounding a discharge opening 20 and is constantly open at its upper end to the valve chamber 11. For selectively closing the discharge opening 20 there is provided a plunger valve 21 which has four radiating guide fingers 22 for constantly centering the valve within the valve chest. The stem 23 of the valve 21 extends upwardly from its head 24 out of the valve chest to make a rigid connection with check valve component 13. The latter rides upon a pair of guide pins 25 which are anchored at their lower ends to the upper rim of the valve chest 17. Toward their upper ends the pins 25 are necked and these necked portions 25a slidably extend through an upwardly dished cross-piece 12a provided by the check valve component 12. This cross-piece bridges an annular rim 12b and with the latter provides a pair of openings 26 (Fig. 4) which cooperate with peripheral cutouts 27 (Fig. 5) in the valve component 13 to communicate the hopper with the valve chamber when the check valve components 12, 13 are apart, that is to say, when the check valve is in an open position. When the check valve is closed to isolate the valve chamber from the hopper, the rim 12b of component 12 substantially closes off the cutouts 27 of the other component 13. At its center the cross-piece 12a is mounted on a hub 28 which is pinned to the lower end of the rod 14. The pins 25 are held stationary with respect to the rod, and hence also with respect to check valve component 12, by a wire spring clip 30 which bears against the upper end of hub 28 by a central coil 30a and grips the upper necked portions of the pins which are circumferentially grooved at 31 to receive the spring arms 30b of the clip. The purpose of this arrangement is to permit the assembly to be readily broken down for cleaning purposes. In other words, the pins 25 and valve chest 17 are one unit, the plunger valve 21 and check valve component 13 are another unit, and the rod 14 and check valve component 12 are a third unit, all of these units being held in assembled relation by the clip 30.

As in Patent No. 2,637,282 the rod 14 has a handle 33 at its upper end and is yieldingly urged upwardly by a spring 34 which is seated at its lower end in a cupped lock ring 35. This lock ring has a handle 36 and engages a circular flange 37 provided near the upper end of a sleeve 38 through which the rod 14 is journaled for reciprocating endwise movement. The flange 37 in turn rests upon a downwardly dished seat 40 formed at the center of a bail 41 which is riveted at its ends to the rim of the hopper. It will be seen that sleeve 38 is formed with a lug 42 spaced below the flange 37 a distance slightly greater than the thickness of the bail seat 40. A center opening is provided in the latter for receiving the sleeve 38 and is intersected by a slot 43 formed in the bail for receiving a locking finger 44 depending from the lock ring 35 and passing through a slot 45 in the flange 37. It will be noted that the slot 43 must be wide enough to permit passage therethrough of the rod 14 and the lug 42 during assembly of the device.

As in my copending application Ser. No. 480,429, filed January 7, 1955, the handle 33 has a depending pin 49 for selectively nesting in radial grooves 46 provided by a dial 47 which is free to turn relative to the rod 14. These grooves 46 are evenly spaced about the periphery of the dial and are of progressively varying depths. Seated within the dial 47 is an upper spring seat 48 which is sleeved on the rod 14 and is stepped to provide a depending boss 48a. This boss is encircled by the spring 34 and serves as a stop to engage the upper end of the sleeve 38 before the spring reaches a fully compressed condition. Upward movement of rod 14 with respect to the hopper due to action of the spring is limited by a collar 50 which bears against the lower end of sleeve 38 when the rod is at its upper limit of travel. This collar can be permanently pinner in position on the rod or can be adjustably mounted by use of a set screw.

Figure 7:
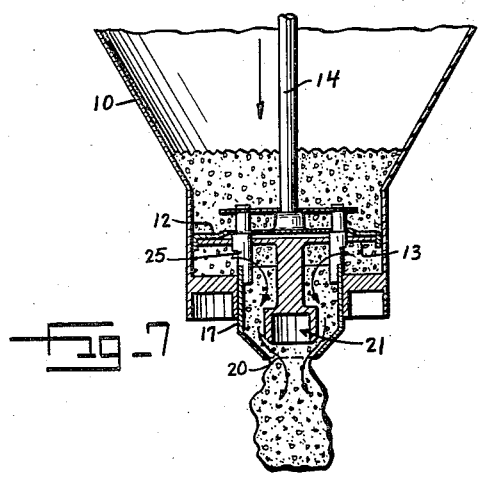
Figure 8:
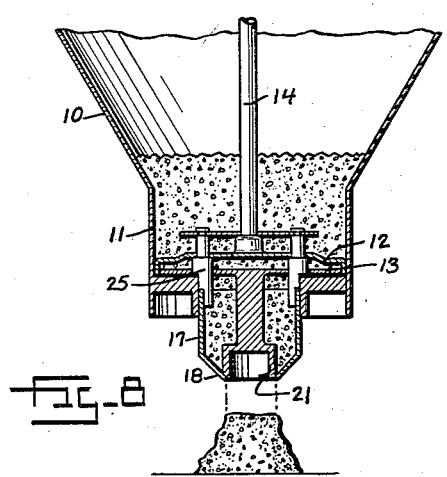
Figure 9:
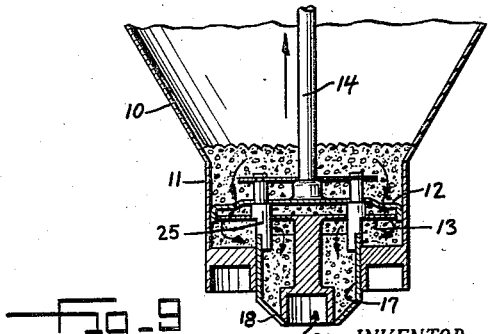

The operation of the device in metering dough is shown in Figs. 6 to 9. The first of these shows the rod 14 at the top of its stroke and with the hopper 10, valve chamber 11, and valve chest 17 full of dough preparatory to the dispensing operation. It should be noted that at this time the check valve 12—13 is open while the plunger valve 21 is closed. As the rod then moves downwardly in response to pressure manually exerted on the handle 33 and carries the check valve component 12 and valve chest 17 with it, the guide pins 25 will slide downwardly through the other check valve component 13. Therefore, during this initial action the check valve will close and the plunger valve will open thereby isolated the valve chamber 11 from the hopper and at the same time commencing the discharge of dough through the opening 20 from the valve chest 17 as shown in Fig. 7. Thereupon the entire lower assembly will continue downwardly as a unit with the rod during which time the dough trapped below the check valve 12—13 will move from the valve chamber proper into the valve chest through the top thereof for discharge. Thus dispensing will continue until the boss 48a has bottomed against the sleeve 38 as determined by the setting of the dial 47. If the handle 33 is then released to permit the now compressed spring 34 to return the rod, the plunger valve 21 will thereupon snap closed (Fig. 8) because of the partial vacuum condition beneath the check valve 12—13 caused by upward movement of component 12 with the rod. At the same time the check valve will open since component 13 and the plunger valve are secured together via the valve stem 23. On the other hand, if the operator doesn't release the handle at the end of the down stroke, the weight of the plunger valve 21 and its related assembly will cause it to drop by the force of gravity back into its closed position. At any rate, as the rod 14 makes its return stroke as shown in Fig. 9 the check valve will be open so that the valve chamber 11 can be automatically replenished with dough from the hopper. The cycle is completed when the collar 50 reaches the sleeve 38.

It is thought that the invention will have been clearly understood from the foregoing detailed description. Changes within the spirit of my teachings may be resorted to without departing from the invention and it is accordingly my intention that the hereto annexed claims be given a scope in their construction fully commensurate with the broadest interpretation to which the employed language admits.

What I claim is:

1. In a dough former, a hopper providing a valve chamber having an inlet and an outlet, a rod extending through the hopper, and mounted for reciprocating endwise movement, a valve chest slidably mounted in said outlet and carried by said rod for unitary endwise movement therewith, said chest having an ingress within said valve chamber and an egress, a check valve in said valve chamber including as complementing parts a valve and valve seat, one part being secured to the rod and the other part floating between said secured part and said valve chest, a plunger valve adapted to close said egress and connected to said floating part of the check valve for unitary movement therewith relative to said valve chest, the distance between the opposite ends of said floating part and plunger valve being less than the distance between said secured part and said egress from the valve chest so that said check valve and plunger valve are alternately opened and closed, and means for reciprocating said rod.

2. In a dough dispenser, a hopper providing a valve chamber having an inlet and an outlet, a rod assembly extending into said chamber and mounted for reciprocating endwise movement, a valve chest slidably fitting in said outlet and secured to said rod assembly for unitary endwise movement therewith, said chest having an ingress within said valve chamber and an egress, a check valve in said valve chamber including as complementing parts a valve and valve seat, one part being secured to the rod assembly and the other part floating on said rod assembly between said secured part and said valve chest, a plunger valve adapted to close said egress and connected to said floating part of the check valve for unitary endwise movement therewith relative to said valve chest, the distance between the check valve closing end of said floating part and the egress closing end of said plunger valve being less than the distance between said secured part and said egress from the valve chest so that said check valve and plunger valve are alternately opened and closed, and means for reciprocating said rod assembly.

3. In a dough dispenser, a hopper assembly providing a valve chamber having an inlet and an outlet, a rod assembly extending into said chamber and slidably mounted on said hopper assembly for reciprocating endwise movement, a valve chest slidably mounted in said outlet and carried by said rod assembly for unitary endwise movement therewith, said chest having an ingress within said valve chamber and an egress, a check valve in said valve chamber including as complementing parts a valve and valve seat, one part being attached to the rod assembly and the other part floating on said rod assembly between said secured part and said valve chest, a plunger valve adapted to close said egress and rigidly connected to said floating part of the check valve to form a unit therewith, the length of said unit being less than the distance between said secured part and said egress from the valve chest so that said check valve and plunger valve are alternately opened and closed, and means for reciprocating said rod assembly.

4. In a dough dispenser, a hopper assembly providing a valve chamber having an inlet and an outlet, a rod assembly extending into said chamber and slidably mounted on said hopper assembly for reciprocating endwise movement, means for reciprocating said rod assembly, spring return means seated against said hopper assembly and operatively associated with said rod assembly for yieldingly resisting endwise movement of the latter toward said outlet, a valve chest slidably mounted in said outlet and carried by said rod assembly for unitary endwise movement therewith, said chest having an ingress within said valve chamber and an egress, a check valve in said valve chamber including as complementing parts a valve and valve seat, one part being attached to the rod assembly and the other part floating on said rod assembly between said secured part and said valve chest, and a plunger valve adapted to close said egress and connected to said floating part of the check valve to form a unit therewith, the length of said unit being less than the distance between said secured part and said egress from the valve chest so that said check valve and plunger valve are alternately opened and closed.

5. In a dough former, a hopper providing a valve chamber having an inlet and an outlet, a rod extending through the hopper and mounted for reciprocating endwise movement, means for reciprocating said rod, a valve chest slidably mounted in said outlet and carried by said rod for unitary endwise movement therewith, said chest having an ingress within said valve chamber and an egress defined by an annular beveled seat, a check valve in said valve chamber including as complementing parts a valve and valve seat, one part being secured to the rod and the other part floating between said secured part and said valve chest, and a plunger valve adapted to engage said beveled seat to close said egress and connected to said floating part of the check valve for unitary movement therewith relative to said valve chest, the distance between the opposite ends of said floating part and plunger valve being less than the distance between said secured part and said beveled seat so that said check valve and egress are alternately opened and closed.

6. In a dough dispenser, a hopper providing a valve chamber having an inlet and an outlet, a rod mounted for reciprocating endwise movement in said hopper, a pair of guide pins extending from the hopper into said chamber and operatively associated with said rod for unitary endwise movement therewith, a valve chest slidably fitting in said outlet and secured to said guide pins for unitary endwise movement therewith, said chest having an ingress within said valve chamber and an egress, a check valve in said valve chamber including as complementing parts a valve and valve seat, one part being secured to the rod and the other part floating on said guide pins between said secured part and said valve chest, a plunger valve adapted to close said egress and connected to said floating part of the check valve for unitary endwise movement therewith relative to said valve chest, the distance between the check valve closing end of said floating part and the egress closing end of said plunger valve being less than the distance between said secured part and said egress from the valve chest so that said check valve and plunger valve are alternately opened and closed, and means for reciprocating said rod assembly.

7. The dough dispenser of claim 6 in which said guide pins have necked portions at their hopper ends which extend through said secured part of the check valve, and clip means for detachably connecting said necked portions to said rod.

8. In a dough dispenser, a hopper with a cylindrical valve chamber having an inlet and a centered outlet of reduced diameter, a rod assembly extending through said inlet into said chamber and mounted for reciprocating endwise movement to make alternate dispensing and return strokes, a cylindrical valve chest slidably fitting in said outlet and secured to said rod assembly for unitary endwise movement therewith, said chest having an ingress within said valve chamber and an egress, a check valve within said valve chamber for isolating a charge of dough in the chamber during the dispensing stroke and including as complementing parts a valve and valve seat, one part being secured to the rod assembly and the other part floating on said rod assembly between said secured part and said valve chest, a plunger valve within the valve chest for closing said egress during the return stroke and connected to said floating part of the check valve for unitary endwise movement therewith relative to said valve chest, the distance between the check valve closing end of said floating part and the egress closing end of said plunger valve being less than the distance between said secured part and said egress from the valve chest so that said check valve and egress are alternately opened and closed, means for reciprocating said rod assembly, and spring return means operatively associated with said rod assembly for yieldingly resisting dispensing strokes of the latter.

9. In a dough dispenser, a hopper assembly providing a hopper and a valve chamber having an inlet from the hopper and an outlet, a rod assembly extending into said chamber and mounted for reciprocating endwise movement to make alternate dispensing and return strokes, a valve chest slidably fitting in said outlet and secured to said rod assembly for unitary endwise movement therewith, said chest having an ingress within said valve chamber and an egress, a check valve within said valve chamber for separating a charge of dough within the chamber from the hopper during the dispensing stroke and including as complementing parts a valve and valve seat, one part being secured to the rod assembly and the other part floating on said rod assembly between said secured part and said valve chest, a plunger valve slidably mounted in the valve chest for closing said egress during the return stroke and connected to said floating part of the check valve for unitary endwise movement therewith relative to said valve chest, the distance between the check valve closing end of said floating part and the egress closing end of said plunger valve being less than the distance between said secured part and said egress from the valve chest so that said check valve and egress are alternately opened and closed, means for reciprocating said rod assembly, an adjustable stop slidably journaled on said rod assembly and arranged to engage said hopper assembly during the dispensing stroke to determine the end thereof, and means for holding said stop in various selected positions with respect to said rod assembly to thereby regulate the length of the dispensing stroke.

10. The dough dispenser of claim 9 in which a return spring is seated between said adjustable stop and said hopper assembly for yieldingly resisting dispensing strokes of the latter.

No references cited.